(12) United States Patent
Hamilton

(10) Patent No.: US 12,247,744 B2
(45) Date of Patent: Mar. 11, 2025

(54) INDEXED VENT FOR NATURAL DRAFT COOKING DEVICES

(71) Applicant: W.C. BRADLEY CO., Columbus, GA (US)

(72) Inventor: Anthony Hamilton, Hamilton, GA (US)

(73) Assignee: W.C. Bradley Co., Columbus, GA (US)

( * ) Notice: Subject to any disclaimer, the term of this patent is extended or adjusted under 35 U.S.C. 154(b) by 481 days.

(21) Appl. No.: 17/556,410

(22) Filed: Dec. 20, 2021

(65) Prior Publication Data
US 2022/0196244 A1 Jun. 23, 2022

Related U.S. Application Data

(60) Provisional application No. 63/127,770, filed on Dec. 18, 2020.

(51) Int. Cl.
*F24B 5/06* (2006.01)
*F23L 3/00* (2006.01)

(52) U.S. Cl.
CPC . *F24B 5/06* (2013.01); *F23L 3/00* (2013.01)

(58) Field of Classification Search
CPC ......... A47J 37/0704; F24B 5/06; F23L 13/02; F23L 13/04; F23L 3/00
USPC ........ 126/25 R, 290, 15 R, 285 R, 538, 518, 126/295; 99/480
See application file for complete search history.

(56) References Cited

U.S. PATENT DOCUMENTS

| | | | |
|---|---|---|---|
| 5,007,403 A * | 4/1991 | Chen ................... | A47J 37/0704 |
| | | | 126/25 AA |
| 9,474,919 B2 * | 10/2016 | Petrossian .............. | F24F 13/14 |
| 10,595,540 B1 | 3/2020 | Knight | |
| 2003/0019368 A1 | 1/2003 | Backus et al. | |
| 2003/0150336 A1 | 8/2003 | Roescher | |
| 2012/0037012 A1 | 2/2012 | Stier | |
| 2018/0263415 A1 * | 9/2018 | Hackley .............. | A47J 37/0786 |
| 2020/0370752 A1 | 11/2020 | Ahmed et al. | |

FOREIGN PATENT DOCUMENTS

WO PCT/US2021/64399 3/2022

* cited by examiner

*Primary Examiner* — Ko-Wei Lin
(74) *Attorney, Agent, or Firm* — GableGotwals; David G. Woodral

(57) ABSTRACT

An opening is defined in a wall, the opening defining a plurality detents along a lower edge thereof. A vent cover affixed to the outer wall such that the vent cover is rotatable to cover and uncover the opening. An indexing mechanism selectively fits into each of the plurality of detents and retain the vent cover from rotation.

18 Claims, 3 Drawing Sheets

INDEXED VENT FOR NATURAL DRAFT COOKING DEVICES

CROSS-REFERENCE TO RELATED CASES

This application claims the benefit of U.S. provisional patent application Ser. No. 63/127,770, filed on Dec. 18, 2020, and incorporates such provisional application by reference into this disclosure as if fully set out at this point.

FIELD OF THE INVENTION

This disclosure relates to cooking devices in general and, more specifically, to an indexed vent for a cooking device.

BACKGROUND OF THE INVENTION

There are many types of outdoor cooking appliances operating on the common principle of having a fire burning a solid combustible material burning in an enclosed chamber to provide heat and smoke for food preparation. In most of these there are vents that provide fresh air to feed the fire and allow exhaust of the products of combustion. In many of these airflow or air intake may be adjusted by opening of one or both of an inlet and exhaust vents. One adjustment mechanism is an opening in a wall of the enclosed chamber with a sliding cover that can be completely closed, completely open, or, at some intermediate position, partially open.

In all such known opening and closing mechanism for the inlet and exhaust vents of a cooking device, the actual opening that allows gas flow is set by movement of the associated door. The opening is allowed to varies in a continuous way, depending on motion to the door imparted by the user. A change in position of the door can be as large or small as desired. However prior positions and future positions of the door are only known by visual estimation. Precise and repeatable control may be difficult. In addition, it is also difficult, if not impossible, to develop a standard procedure for regulating gas flow during various stages of combustion and cooking.

Some products incorporate some combination of index marks and/or numbers as a basis for repeatability. However, as the sliding movement of the cover or door over the respective opening is governed by friction and/or gravity, it is not necessarily the case that an opening set in this way will maintain its area, especially over a long period of time as may be needed for low temperature cooking.

What is needed is a system and method for addressing the above and related issues.

SUMMARY OF THE INVENTION

The invention of the present disclosure, in one aspect thereof, comprises a grill having an enclosure defined by an outer wall, an opening defined in the outer wall, the opening defining a plurality detents along a lower edge thereof, a vent cover affixed to the outer wall such that the vent cover is rotatable to cover and uncover the opening, and an index pin protruding from the vent cover and positioned to selectively fit into each of the plurality of detents and retain the vent cover from rotation.

In some embodiments, the index pin protrudes away from the enclosure and provides a handle for adjusting the vent cover. The vent cover may be affixed to an outer side of the outer wall. In other cases the vent cover is affixed to an inner side of the outer wall.

A fastener may protrude from the outer wall and be fitted into a pivot slot defined in the vent cover. The pivot slot allows elevation of the vent cover for movement of the index pin between the plurality of detents. The index pin may have an outer contour corresponding to a contour of the plurality of detents. The index pin ay also have a cooperating radius with radii of the plurality of detents.

The grill may include a fuel support grate within the outer wall, the opening in the outer wall being defined proximate the fuel support grate. The outer wall nay have a door proximate the fuel support grate and the vent opening is defined in the door.

The invention of the present disclosure, in another aspects thereof, comprises a grill with an enclosure defining a cooking chamber and a firebox below the cooking chamber, a fuel support grate in the firebox, a door below the cooking chamber and proximate the fuel support grate, a vent opening defined in the door, the vent opening having a lower edge defining a plurality of detents, and a vent cover affixed to the door and being rotatable such that a pin on the vent cover selectively fits into each one of the plurality of detents to allow repeatable degrees of opening of the vent opening.

The vent cover may affix to the door above the vent opening at a point such that the vent cover rotates to cover and uncover the vent opening. The vent cover may receive a fastener from the door through a slotted opening in the vent cover such that the vent cover may slide upward as well as rotate. The pin and the plurality of detents may have cooperating radii. In some cases the door is affixed to the cooking chamber by hinges allowing the door to be opened, and the has a latch cooperative fitting to a catch on the enclosure for keeping the door closed.

The invention of the present disclosure, on another aspect thereof, comprises a grill having an enclosure with planar ends and defining between them an upper cooking chamber and a lower firebox. The grill includes a fuel support grate in the firebox, a door allowing access through one of the planar ends to the fuel support grate, and a vent opening defined in the door. The grill has a cover with a plurality of opening positions, the plurality of opening positions defined by the fit of a pin on the cover into one of a plurality of detents defined in an edge of the vent opening.

In some embodiments, the cover is pivotally and slidably attached to the door to allow movement of the pin between the plurality of detents. The cover may receive a fastener from the door in a slot defined in the cover. The pin may be retained in the plurality of detents via gravity. In some cases the slot is proximate and upper edge of the cover and the pin is proximate a lower edge of the cover. The detents may be defined in an edge of the vent opening are defined in a lower edge of the vent opening. In some cases the pin is cylindrical and the detents correspond to circle arcs.

DETAILED DESCRIPTION OF THE PREFERRED EMBODIMENTS

Figure 1:
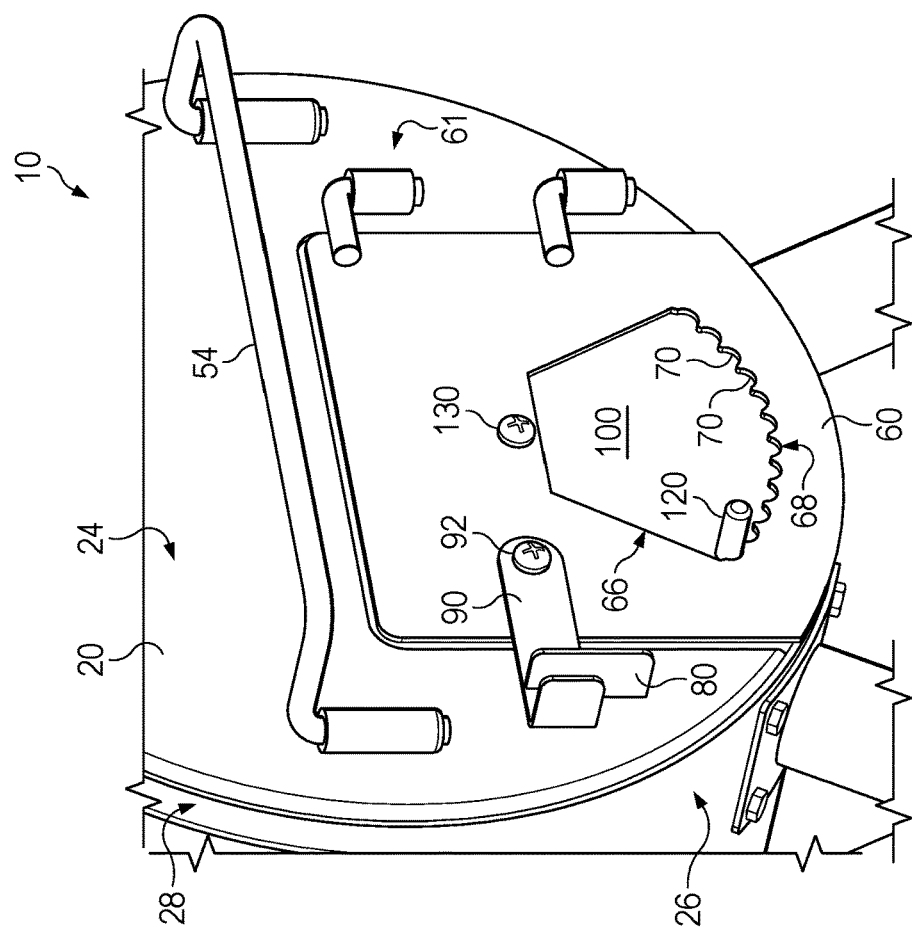
FIG. 1 is a perspective view of a grill according to aspects of the present disclosure.
Figure 2:
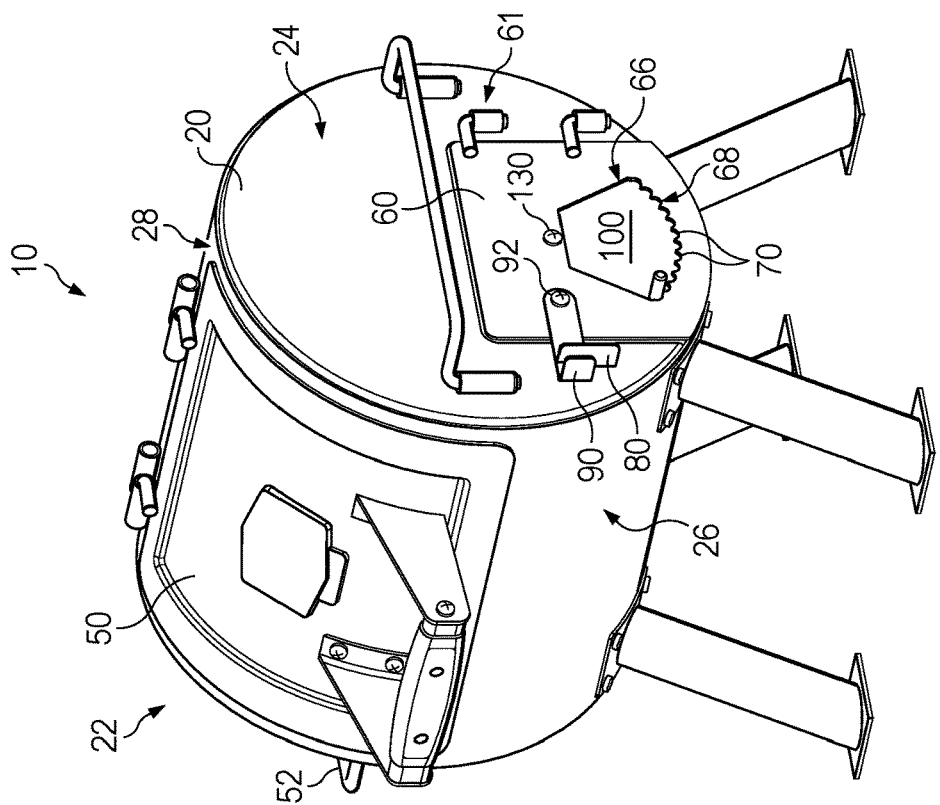
FIG. 2 is an enlarged perspective view of the grill of FIG. 1.
Figure 4:
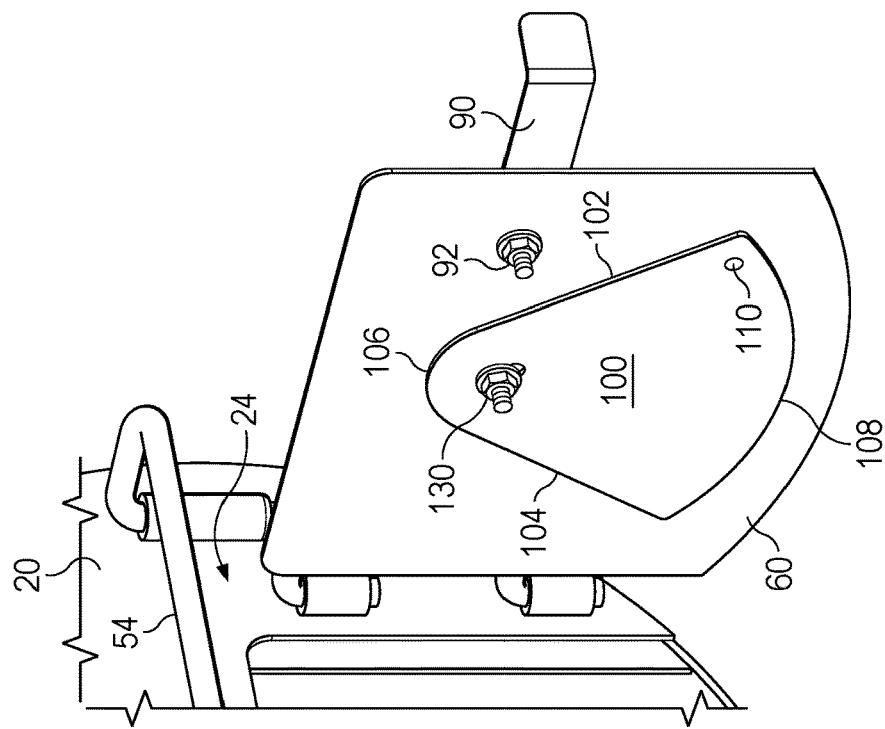
FIG. 4 is an enlarged perspective view of the opened side door of FIG. 3.
Figure 3:
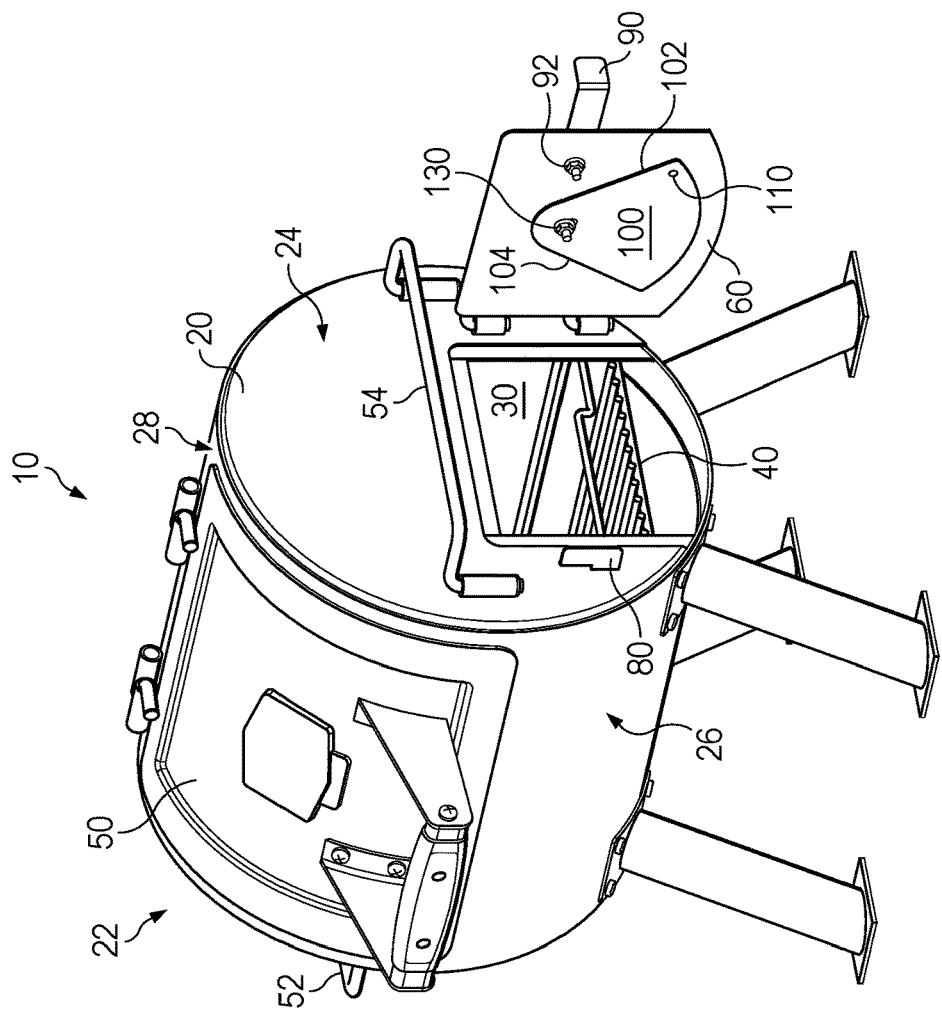
FIG. 3 is a perspective view of the grill of FIG. 1 shown with a side door opened.
Figure 6:
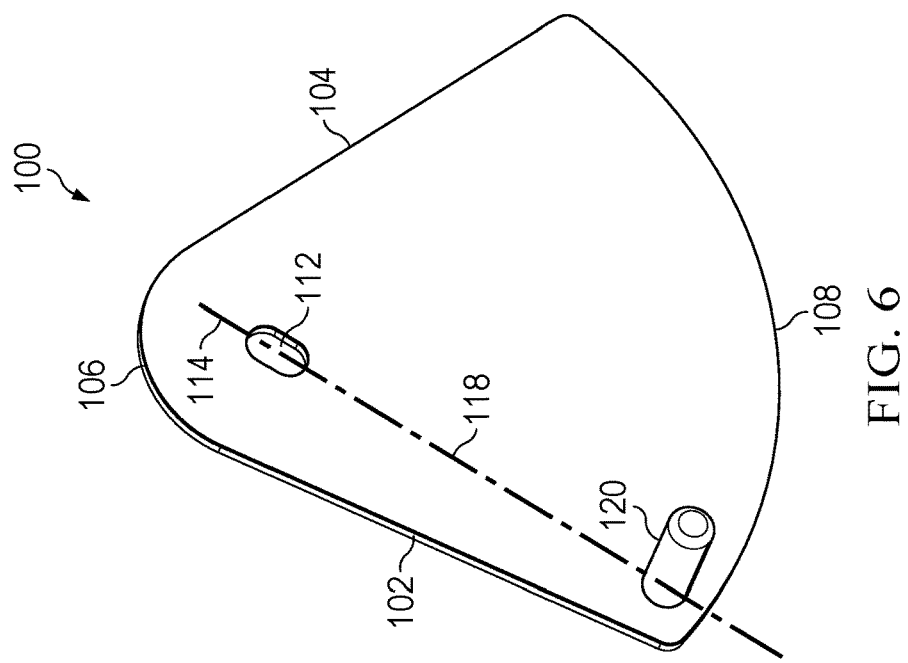
FIG. 6 is an enlarged perspective view of a vent cover for selectively covering an opening in the side door of FIG. 3.
Figure 5:
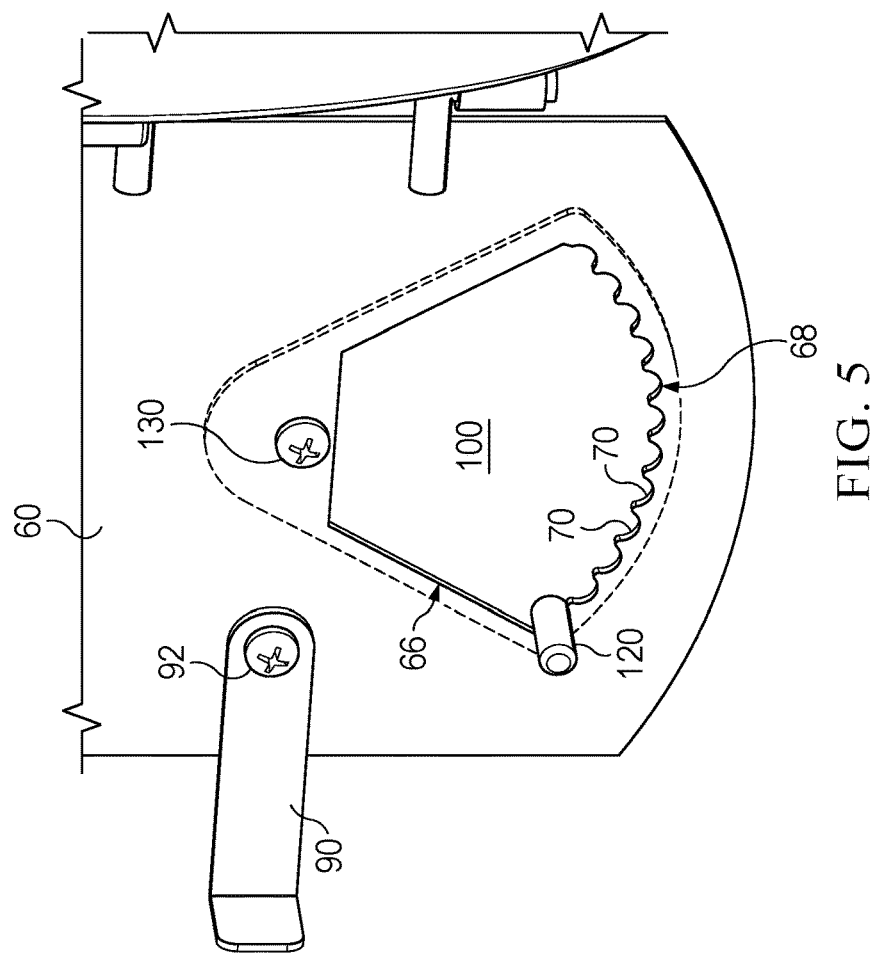
FIG. 5 is an enlarged perspective view of an inside of the side door of FIG. 3.

Referring now to FIG. 1 a perspective view of a grill 10 according to aspects of the present disclosure is shown. FIG. 2 is an enlarged perspective view of the grill 10. FIG. 3 is a perspective view of the grill 10 a side door 60 opened. Figure is an enlarged perspective view of the opened side door 60. FIG. 5 is an enlarged perspective view of an inside of the side door 60. FIG. 6 is an enlarged perspective view of a vent cover 100 for selectively covering an 66 opening in the side door 60.

With more particularity, grill 10 may include an enclosure 20 having a first side 22, a second side 24, a lower portion 26, and an upper portion 28. The enclosure 20 may define a cooking chamber 30. A lower fuel grate 40 may be located within lower portion 26 inside a cooking chamber 30. The lower portion 26 may be referred to also as a firebox. The enclosure 22 can be seen to be generally cylindrical or barrel shaped with flat ends or sides 22, 24. However, other configurations are contemplated. The cooking chamber 30 may include a food support grate (not shown) for supporting food during cooking operation.

The food support grate may be accessed via upper door 50, which may be pivotally attached to upper portion 28 of enclosure 20. First side rail 52 may be affixed to the first side 22 of the enclosure 20. A second side rail 54 may be affixed to the second side 24 of the enclosure 20.

In some embodiments, a side door 60 is pivotally attached to the second side 24 for allowing access to the firebox 26, above and/or below fuel grate 40 for providing fuel and for removal of ashes and/or burnt fuel. The side door 60 may define a latch pivot orifice, a vent cover pivot orifice, and a vent cover opening 66 below the vent cover pivot orifice. A latch fastener 92 passes through the latch pivot orifice of the side door 60 for pivotally attaching latch 90 to side door 60. In other embodiments, the latch 90 may be surface mounted to the door 60 rather than installed via the fastener 92 through the door 60. A catch 80 may protrude from second side 24 of enclosure 20 to retain the latch 90 when the door 60 is closed and latched. The door 60 may attach to the second side 24 on one or more hinges 61. It should be understood that the position of the hinges 61 and latch 90 could be reversed, although having the door open to the front of the grill 10 may provide more convenience. It should also be understood that the door 60 and the associated components could be installed on the opposite (first) side 21.

The vent cover opening 66 defined in the side door 60 has may have an arcuate lower edge or surface 68. The opening 66 may approximate a segment of a disc. The lower edge or surface 68 may approximate an arc of a circle defining a plurality of indentations or detents 70. The detents 70 each defining a detent radius, discussed further below. However, in other embodiments, the plurality of indentations or detents may not be arcuate. The detents 70 may be formed by cutting out material from the cover opening 66 when the opening 66 is formed or after, my molding or casting, or by folding or displacing material of the side door 60 at the lower surface or edge 68.

A vent cover 100 may define first edge or side wall 102, a second edge or side wall 104, an upper edge or surface 106, and an arcuate lower edge or surface 108. The first side wall 102 and second side wall 104 may converge toward upper surface 106. Thus the vent cover may have somewhat of a pie shape or could be said to cover an segment of a disc with respect to a center at or near the upper surface 106.

The vent cover 100 may define an indexing pin orifice 110 proximate arcuate lower surface 108. The vent cover 100 may define a pivot slot 112 adjacent upper surface 106. Pivot slot 112 has a top 114 and a long axis oriented along a radial line 118 that runs from top 114 of pivot slot 112 to indexing pin orifice 110.

A vent cover fastener 130 may pass through the vent cover pivot orifice of the side door 60 and through pivot slot 112 of a vent cover 100 for pivotally attaching vent cover 100 to side door 60. In other embodiments, the fastener 130 may be fixed to the cover 100 and the side door 60 may be slotted to accommodate slight movement of the vent cover 100.

In other embodiments, the vent cover 100 may be surface mounted to the side door 60. Where the vent cover is surface mounted to the interior side of the door 60, the indexing features described below would need no reconfiguration from the illustrated embodiment.

An indexing pin/handle 120 may be affixed to vent cover 100 at indexing pin orifice 110. The indexing pin/handle 120 may have a complementary radius to the detent radius of arcuate detents 70 of vent cover opening 66. In other embodiments, the pin/handle may not have a radius, but may still have a shape corresponding to the detents 70 in the lower edge or surface 68. In some embodiments, the pin 120 is not a separate component from the vent cover 100 but comprises a protuberance or outward deformation in part of the vent cover 100.

In use, vent cover 100 may be pivoted by a desired amount about vent cover fastener 130 to provide a desired opening size within vent cover opening 66 (e.g., to provide a desired amount of air flow through vent cover opening 66). The indexing pin/handle 120 may be grasped by a user and vent cover 100 lifted upwards or in a radial direction towards the vent cover fastener 130, thereby sliding the vent cover 100 about the vent cover fastener 130 within the pivot slot 112 for disengaging the indexing pin/handle 120 from one of arcuate detents 70 in which the indexing pin/handle 120 rests. When the vent cover 100 is moved radially about the vent cover fastener 130, the indexing pin/handle 120 may be relocated tangentially and lowered into a desired arcuate detent 70, thereby incrementing a location of the indexing pin/handle 120 and setting a desired amount of vent cover opening 66 that may flow vent air. By locating the indexing pin/handle 120 in a selected arcuate detent, the position of the vent cover 100 may be positioned by a discrete and repeatable amount. Even where the pin/handle and/or detents are not arcuate, their shapes individually and together may be such that the vent cover may be discretely and repeatably indexed to allow a predetermined flow through the vent opening 66.

As described above, the vent cover 100 could also be installed via a surface mount. If installed via an interior surface mount, the pin 120 would be installed facing inwardly (e.g., toward the fuel grate 40) and a separate exterior handle would be needed for manipulation of the vent cover 100.

With the various embodiments of the present disclosure a grill or cooking apparatus now has a large range and number of fixed values of an intake vent opening area. The settings using such device are entirely repeatable, and can be used to create a set of prior instructions constituted in the form of a recipe or instructed operating procedure. Additionally, once set, the vent area opening will not be subject to change due to temperature changes, vibrations, or other outside influences but will maintain its position indefinitely.

The side door 60 could be replicated (including vent opening 66, vent cover 100, and all associated parts and functions) to both sides 22, 24 of the grill 10. This would allow for dual controls over air flow to the fuel. The sides 22, 24, the side door 60, and the vent cover door 10 are flat or planar in the illustrated embodiments. However, all or a portion of these components could have a curvature so long as the vent cover door 100 functions with the vent opening 66 to block air flow when closed and to allow incremental and repeatable adjustment of airflow via interaction with the lower edge 68 of vent opening by the pin 120 or similar structure.

Fasteners according to the present disclosure may comprise nuts, bolts, screws, rivets, or any other implements known to the art that provide the functionality described herein.

If an item is described as "selectively" capable of a function or operation, the item is considered to have the requisite structure to fulfill the stated function or operation when placed or moved according to the description.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A grill comprising:
    an enclosure defined by an outer wall;
    an opening defined in the outer wall, the opening defining a plurality of detents along a lower edge thereof;
    a vent cover affixed to the outer wall such that the vent cover is rotatable to cover and uncover the opening;
    an index pin protruding from the vent cover and positioned to selectively fit into each of the plurality of detents and retain the vent cover from rotation; and
    a fastener protruding from the outer wall and fitted into a pivot slot defined in the vent cover, the pivot slot allowing elevation of the vent cover for movement of the index pin between the plurality of detents.

2. The grill of claim 1, wherein the index pin protrudes away from the enclosure and provides a handle for adjusting the vent cover.

3. The grill of claim 1, wherein the vent cover is affixed to an outer side of the outer wall.

4. The grill of claim 1, wherein the vent cover is affixed to an inner side of the outer wall.

5. The grill of claim 1, wherein the index pin has an outer contour corresponding to a contour of the plurality of detents.

6. The grill of claim 5, wherein the index pin has a cooperating radius with radii of the plurality of detents.

7. The grill of claim 1, further comprising a fuel support grate within the outer wall, the opening in the outer wall being defined proximate the fuel support grate.

8. The grill of claim 1, wherein the outer wall has a door proximate fuel support grate, and the opening is defined in the door.

9. A grill comprising:
- an enclosure defining a cooking chamber and a firebox below the cooking chamber;
- a fuel support grate in the firebox;
- a door below the cooking chamber and proximate the fuel support grate;
- a vent opening defined in the door, the vent opening having a lower edge defining a plurality of detents; and
- a vent cover affixed to the door and being rotatable such that a pin on the vent cover selectively fits into each one of the plurality of detents to allow repeatable degrees of opening of the vent opening;
- wherein the vent cover affixes to the door above the vent opening at a point such that the vent cover rotates to cover and uncover the vent opening.

10. The grill of claim 9, wherein the vent cover receives a fastener from the door through a slotted opening in the vent cover such that the vent cover may slide upward as well as rotate.

11. The grill of claim 10, wherein the pin and the plurality of detents have cooperating radii.

12. The grill of claim 11, wherein the door is affixed to the cooking chamber by hinges allowing the door to be opened, and the door has a latch cooperative fitting to a catch on the enclosure for keeping the door closed.

13. A grill comprising:
- an enclosure having planar ends and defining between them an upper cooking chamber and a lower firebox;
- a fuel support grate in the firebox;
- a door allowing access through one of the planar ends to the fuel support grate;
- a vent opening defined in the door;
- a cover having a plurality of opening positions, the plurality of opening positions defined by the fit of a pin on the cover into one of a plurality of detents defined in an edge of the vent opening;
- wherein the cover is pivotally and slidably attached to the door to allow movement of the pin between the plurality of detents.

14. The grill of claim 13, wherein the cover receives a fastener from the door in a slot defined in the cover.

15. The grill of claim 14, wherein the pin is retained in the plurality of detents via gravity.

16. The grill of claim 15, wherein the slot is proximate upper edge of the cover and the pin is proximate a lower edge of the cover.

17. The grill of claim 15, wherein the detents defined in an edge of the vent opening are defined in a lower edge of the vent opening.

18. The grill of claim 16, wherein the pin is cylindrical and the detents correspond to circle arcs.

* * * * *